United States Patent [19]
Heider et al.

[11] 3,829,570
[45] Aug. 13, 1974

[54] THERAPEUTIC COMPOSITIONS AND METHOD

[75] Inventors: Joachim Heider, Warthausen-Oberhofen; Wolfgand Eberlein; Gunther Engelhardt, both of Biberach/Riss, all of Germany

[73] Assignee: C. H. Boehringer Sohn, Ingelheim/Rhein, Germany

[22] Filed: Jan. 22, 1973

[21] Appl. No.: 325,558

Related U.S. Application Data

[63] Continuation-in-part of Ser. No. 109,975, Jan. 26, 1971, Pat. No. 3,740,392.

[52] U.S. Cl. ............................................. 424/241
[51] Int. Cl. ........................................... A61k 17/00
[58] Field of Search ................................. 424/241

[56] References Cited
UNITED STATES PATENTS
3,053,836  9/1962  Fried ............................. 260/239.55
3,374,230  3/1968  Gardner et al. ................. 260/239.55

*Primary Examiner*—Henry A. French
*Attorney, Agent, or Firm*—Nelson Littell

[57] ABSTRACT

Novel anti-inflammatory compositions comprised of an effective amount of an ester of fluocinolone-acetonide or 6α,9α-difluoro-16α,17α-isopropylidenedioxy-$\Delta^{1,4}$-pregnadiene-11β,21-diol-c,20-dione 21-diol-3,20-dione of the formula

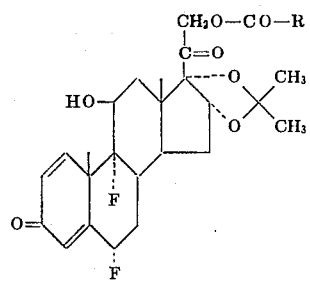

wherein R is selected from the group consisting of pyridine-3, pyridine-4, benzofuran-2 or e-menthoxymethyl and a method of treating inflammation in warm-blooded animals.

10 Claims, No Drawings

THERAPEUTIC COMPOSITIONS AND METHOD

PRIOR APPLICATION

This application is a continuation-in-part of our co-pending application Ser. No. 109,975 filed Jan. 26, 1971, now U.S. Pat. No. 3,740,392.

OBJECT OF THE INVENTION

It is an object of the invention to provide novel therapeutic compositions having high glucocorticoid and anti-phlogistic activity.

It is an additional object of the invention to provide a novel method of reducing inflammation in warm-blooded animals.

These and other objects and advantages of the invention will become obvious from the following detailed description.

THE INVENTION

The novel compositions of the invention are comprised of an effective amount of an ester having the formula

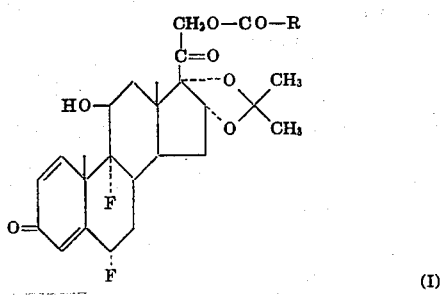

wherein R is selected from the group consisting of pyridine-3, pyridine-4, benzofuran-2 or 1-menthoxymethyl and a pharmaceutical carrier. Compounds of formula I are fluocinolone-acetonide-21-isonicotinate, fluocinolone-acetonide-21-nicotinate, fluocinolone-acetonide-21-benzofuranate and fluocinolone-acetonide-21-l-menthoxy-acetate.

The compositions have the advantage over prior art esters in having a greater anti-inflammatory activity and reduced hypophysial inhibiting activity, an undesired side effect. While known esters had a greater anti-inflammatory activity, the side effects were increased to the same degree.

The preparation of the esters of formula I comprises reacting fluocinolone-acetonide of the formula

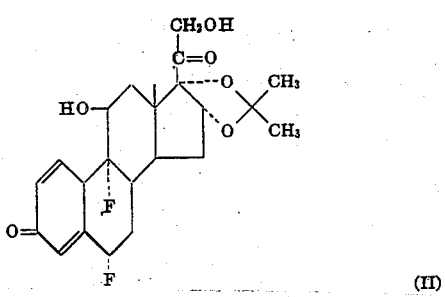

with an acylating derivative of an acid selected from the group consisting of nicotinic acid, isonicotinic acid, benzo-2-furan carbonic acid and 1-menthoxy-acetic acid at a temperature of 0° to 90°C to form the corresponding 21-acid ester of fluocinolone-acetonide. The acylating derivative may be an acid halide, symmetrical or mixed acid anhydride or imidazolides.

The reaction is preferably carried out in the presence of an inert organic solvent such as tetrahydrofuran, dimethyl formamide or dioxane and optionally in the presence of a hydrogen halide binding agent, preferably in the presence of a tertiary amine such as pyridine. This amine may even be simultaneously used as the solvent. If an imidazolide of one of the mentioned acids is used, the reaction will proceed at room temperature and produces a high yield especially if an imidazole salt is used as catalyst. It is not necessary to isolate the used imidazolide. A solution of sulfinyl diimidazolide in an inert solvent obtained in known manner is preferably mixed with the corresponding acid and after approximately 30 minutes stirring, the fluocinolone-acetonide is added thereto.

The compounds can also be obtained by reacting fluocinolone-acetonide with one of the mentioned carboxylic acids if dicyclohexylcarbodiimide is used as dehydrating agent. This reaction is advantageously carried out in a solvent such as pyridine or dioxane at room temperature or at elevated temperatures. The progress of the reaction can be checked in all cases by thin-layer chromatography. The crude product thus obtained may be purified for example, chromatographically, for instance over a silica gel column.

The novel anti-inflammatory compositions of the invention may be in the form of aerosols, ointments, creams, tinctures, drops and suspensions. Topical preparations preferably contain 0.00125 to 0.125 percent, preferably 0.01 percent, by weight of the esters of formula I and individual systemic doses are 0.05 to 0.25 mg, preferably 0.125 mg, of the active ester of formula I. The compositions may also contain other active ingredients such as antibiotics, antihistamines and vasoconstrictive agents for use in eye drops or ear drops, for example.

The novel method of the invention for preventing or reducing inflammation in warm-blooded animals comprises administering to warm-blooded animals an effective amount of an ester of formula I. The said esters can be administered topically or systemically, i.e. orally or transcutaneously. The usual daily systemic dose is 0.25 to 2.0 mg/kg.

In the following examples there are described several preferred embodiments to illustrate the invention. However, it should be understood that the invention is not intended to be limited to the specific embodiments.

EXAMPLE 1

Fluocinolone-acetonide-21-isonicotinate 225 mg of fluocinolone-acetonide dissolved in 4 ml of pyridine and 250 mg of isonicotinic acid anhydride dissolved in 4 ml of dioxane were mixed together and stirred for four hours at room temperature. The progress of the reaction was checked by thin-layer chromatography. After pouring the reaction solution into approximately 100 ml of 3 percent ammonium chloride solution, the precipitate was filtered off and dissolved in chloroform. The solution was dried and evaporated to dryness and the residue was recrystallized from a methanol/water mixture to obtain 260 mgm (95 percent of theory) of fluocinolone-acetonide-21-isonicotinate or 6α, 9α-difluoro-16α, 17α-isopropylidenedioxy-21-isonicotinoyloxy-Δ$^{1,4}$-pregnadiene-11β-ol-3,20-dione in the form of white crystals melting at 250°C (decomp.).

EXAMPLE 2

Fluocinolone-acetonide-21-benzofuranate 225 mgm of fluocinolone-acetonide dissolved in 2 ml of pyridine and 250 mgm of benzofuran-2-carbonic acid chloride dissolved in 3 ml of dioxane were admixed and stirred for six hours at room temperature. The course of the reaction was followed by thin-layer chromatography. After having poured the reaction solution into approximately 100 ml of 3 percent ammonium chloride solution, the precipitate was filtered off and subsequently dissolved in chloroform. The chloroform solution was dried and evaporated to dryness. The residue was recrystallized from methanol/water mixture to obtain 285 mgm (95 percent of theory) of fluocinolone-acetonide-21-benzofuranate or 6α, 9α-difluoro-16α, 17α-isopropylidene-dioxy-21-(benzofuran-2-carbonyloxy)-Δ$^{1,4}$-pregnadiene-11β-ol-3,20-dione in the form of white crystals melting at 265° to 270°C.

EXAMPLE 3

Fluocinolone-acetonide-21-nicotinate 225 mgm of fluocinolone-acetonide dissolved in 4 ml of pyridine and 250 mgm of nicotinic acid and 500 mgm of dicyclohexylcarbodiimide dissolved in 4 ml of dioxane were mixed together and stirred at room temperature for twenty hours. The reaction mixture was further processed as described in Example 1 and subsequently the reaction mixture was purified chromatographically over a silica gel column (silica-gel 0.2–0.5 mm; chloroform: methanol 19:1, 9:1 and 7:1). The reaction product was recrystallized from a mixture of ether and hexane to obtain 160 mgm (53 percent of theory) of fluocinolone-acetonide-21-nicotinate or 6α, 9α-difluoro-16α, 17α-isopropylidenedioxy-21-nicotinoyloxy-Δ$^{1,4}$-pregnadiene-11β-ol-3,20-dione in the form of white crystals melting at 200°–203°C.

EXAMPLE 4

Fluocinolone-acetonide-21-isonicotinate 0.15 ml of thionyl chloride was added dropwise to a solution of 400 mg of imidazole in 10ml of tetrahydrofuran and the precipitate of imidazole hydrochloride was vacuum filtered under a nitrogen atmosphere. 240 mg of isonicotinic acid were added to the filtrate and the mixture was shaken for 30 minutes. Then, 100 mg of fluocinolone acetonide and sodium imidazolide (catalyst) were added to the reaction mixture which was allowed to stand overnight. Thin-layer chromatography showed the reaction to be complete and the reaction mixture was then processed as in Example 1. The product was recrystallized from a methanol/water mixture to obtain 95 mg (67 percent of theory) of fluocinolone acetonide-21-isonicotinate or 6α, 9α-difluoro-16α, 17-α-isopropylidene-dioxy-21-isonicotinoyloxy-Δ$^{1,4}$-pregnadiene-11β-ol-3,20-dione in the form of white crystals beginning to melt at 250°C (decomp.).

EXAMPLE 5

Fluocinolone-acetonide-21-l-menthoxy-acetate 450 mg of fluocinolone-acetonide, 500 mg of l-menthoxyacetic acid and 500 mg of dicyclohexylcarbodiimide were dissolved in 5 ml of pyridine and the solution was heated on the steam bath for five hours. The reaction mixture was evaporated to dryness and the residue was dissolved in acetone. The solution was filtered to remove dicyclohexylurea and the filtrate was purified over a silica gel column (0.2–0.5 mm) with chloroform: acetone 19:1, 9:1 and 7:1. The crude product was recrystallized from a 1:1 water/ethanol mixture to obtain 600 mg (92 percent of theory) of fluocinolone acetonide-21-1-menthoxy-acetate or 6α, 9α-difluoro-16α, 17α-isopropylidenedioxy-21-(l-menthoxy acetoxy)-Δ$^{1,4}$-pregnadiene-11β-ol-3,20-dione in the form of white crystals melting at 202°–205°C.

PHARMACEUTICAL EXAMPLES

EXAMPLE A

Metered aerosol inhalator

Composition
1 Container of 125 single doses contains:

| | | |
|---|---|---|
| Fluocinolone-acetonide-21-isonicotinate | 0.625 | mgm |
| Chloropheniramine maleate | 62.5 | do. |
| 2-(5,6,7,8-tetrahydro-1-naphthylamino)-2-imidazoline HCl | 15.0 | do. |
| Neomycin sulfate | 12.5 | do. |
| Sorbitan trioleate | 43.75 | do. |
| Chamomile oil | 6.25 | do. |
| Isopropyl myristate | 125.0 | do. |
| Trifluorotrichloroethane | 64.375 | do. |
| Monofluorotrichloroethane/difluorodichloromethane/tetrafluorodichloroethane 30:30:40 | 8670.0 | do. |
| | 9000.0 | mgm |

The micronized active ingredients were suspended in a mixture of sorbitan trioleate, chamomile oil, isopropyl myristate and trifluorotrichloro ethane with an immersion homogenizer and the suspension was stirred into the propellant gas mixture cooled to −45°C. The mixture was added to the metered aerosol containers and was immediately closed by metering valves to obtain aerosol which would dispense 0.005 mg of fluocinolone-acetonide-21-isonicotinate, chloropheniramine maleate, 0.12 mg of 2-(5,6,7,8-tetrahydro-1-naphthylamino)-2-imidazoline hydrochloride and 0.1 mg of neomycin sulfate per dose.

EXAMPLE B

Metered Aerosol Inhalator

Composition:
1 Container (= 150 single doses) contains:

| | | |
|---|---|---|
| Fluocinolone acetonide-21-benzofuranate | 3.75 | mgm |
| Sorbitan trioleate | 37.5 | do. |
| Monofluorotrichloromethane | 2648.05 | do. |
| Difluorodichloromethane/tetrafluorodichloroethane 70:30 | 7810.7 | do. |
| | 10500.0 | mgm |

Production:

Into a mixture of sorbitan trioleate and monoflourotrichloromethane was suspended micronized fluocinolone acetonide-21-benzofuranate with an immersion homogenizer. This mixture was stirred into the propellant gas mixture cooled to −50°C. At −50°C the suspension was filled into metered aerosol containers. Immediately after filling, the containers were closed by a metering valve so that 0.025 mg of fluocinolone acetonide-21-benzofuranate is dispensed in each dose.

EXAMPLE C

Ointment

Composition:

| | | |
|---|---|---|
| Fluocinolone-acetonide-21-isonicotinate | 0.01 | gm |
| Vaseline | 20.0 | do. |
| Decyl ester of oleic acid | 15.0 | do. |
| Cetyl alcohol | 1.0 | do. |
| Wool wax alcohol | 2.0 | do. |
| Sorbitan monooleate | 4.0 | do. |
| Distilled water | 57.99 | do. |
| | 100.0 | gm |

Production:

Micronized fluocinolone-acetonide-21-isonicotinate was suspended with an immersion homogenizer into the molten fatty phase cooled to 70°C. Distilled water was heated to 70°C and emulsified into the fatty phase. It was cooled to room temperature while stirring.

EXAMPLE D

Cream with 0.01% of Fluocinolone-acetonide-21-benzofuranate, 0.3% of Pimaricin, 0.2% of Hexachlorophene, 0.01% of Vitamin-A-acetate and 0.02% of Vitamin-E-acetate Composition:

| | | |
|---|---|---|
| Fluocinolone-acetonide-21-benzofuranate | 0.01 | gm |
| Pimaricin | 0.3 | do. |
| Hexachlorophene | 0.2 | do. |
| Vitamin-A-acetate | 0.01 | do. |
| Vitamin-E-acetate | 0.02 | do. |
| Butylhydroxyanisol | 0.1 | do. |
| Decyl ester of oleic acid | 11.0 | do. |
| Cremophor O | 4.4 | do. |
| Cetylstearyl alcohol | 5.5 | do. |
| Sperm oil | 3.3 | do. |
| Glycerin monostearate | 4.4 | do. |
| Silicon oil AK 350 | 2.0 | do. |
| Perfume concentration a la Nivea | 0.2 | do. |
| 70% Sorbitol | 5.0 | do. |
| Citric acid | 0.1 | do. |
| Disodium phosphate · 2 H$_2$O | 0.4 | do. |
| Distilled water | 63.06 | do. |
| | 100. | gm |

Production:

In a melt of decyl ester of oleic acid, Cremophor, cetylstearyl alcohol, sperm oil, glycerin monostearate and silicon oil were dissolved at 70°C hexachlorophene, vitamin-A-acetate, vitamin-E-acetate and butylhydroxyanisol. Subsequently, the micronized fluocinolone-acetonide-21-benzofuranate and the micronized pimaricin were suspended with an immersion homogenizer. Distilled water was heated to 70°C and therein were dissolved citric acid, disodium phosphate and sorbitol. The oily suspension of the active ingredients was added to the aqueous phase while stirring at the indicated temperature. The resulting emulsion was homogenized and cooled to 45°C. After addition of the perfume, the cream was degased and cooled to room temperature while stirring slowly.

EXAMPLE E

Lotion with 0.01% of Fluocinolone-acetonide-21-isonicotinate

Composition:

| | | |
|---|---|---|
| Fluocinolone-acetonide-21-isonicotinate | 0.01 | gm |
| Sorbitan monopalmitate | 1.0 | do. |
| Cremophor O | 2.0 | do. |
| Cetylstearyl alcohol | 2.0 | do. |
| Sperm oil | 1.0 | do. |
| Decyl ester of oleic acid | 5.0 | do. |
| Paraffin oil | 1.0 | do. |
| Distilled water | 87.99 | do. |
| | 100.0 | gm |

Production:

The micronized active ingredient was suspended with an immersion homogenizer in the fatty phase at 70°C, and the suspension was emulsified into water of the same temperature. The emulsion was cooled to room temperature.

EXAMPLE F

Foam Aerosol with 0.01% of Fluocinolone-acetonide-21-isonicotinate

Composition:
   1 Container comprises

| | | |
|---|---|---|
| Fluocinolone-acetonide-21-isonicotinate | 0.0025 | gm |
| Glycerin | 1.0 | do. |
| Isopropyl myristate | 0.3 | do. |
| Cetylstearyl alcohol | 0.45 | do. |
| Na cetylstearylsulfate | 0.05 | do. |
| Methyl p-hydroxy-benzoate | 0.025 | do. |
| Distilled water | 20.1725 | do. |
| Difluorodichloromethane/tetrafluorodichloroethane 60:40 | 3.0 | do. |
| | 25.0 | gm |

Production:

The melt of isopropyl myristate with cetylstearyl alcohol and sodium cetylstearyl sulfate was emulsified into the aqueous solution of methyl p-hydroxybenzoate at 70°C. It was cooled to room temperature and the suspension of the micronized fluocinolone-acetonide-21-isonicotinate in glycerin was added. The emulsion was filled into aerosol containers. The latter were sealed by a disk valve. Subsequently, the propellant gas mixture was pressed into it by means of pressure filling and it was homogeneously distributed in the emulsion by shaking. Finally, the valves were equipped with foam dispensers.

EXAMPLE G

Tincture with 0.04% of Fluocinolone-acetonide-21-isonicotinate, 0.5% of Hexachlorophene and 0.02% Vitamin-E-acetate Composition:
   100 ml of tincture comprise:

| | | |
|---|---|---|
| Fluocinolone-acetonide-21-isonicotinate | 0.04 | gm |
| Hexachlorophene | 0.5 | do. |
| Vitamin-E-acetate | 0.02 | gm |
| 96% Ethanol | 58.54 | do. |
| Distilled water | 30.0 | do. |
| | 89.1 | gm = 100 ml |

The active ingredients were dissolved successively in ethanol. Then the water was added and the solution was filtered.

EXAMPLE H

Eye drops with 0.01% of Fluocinolone-acetonide-21-benzofuranate, 0.07% of Polymyxine-B-sulfate, 0.6% of Oxytetracyclin-HCl and 0.07% of 2-(5,6,7,8-Tetrahydro-1-Naphthylamino)-2-Imidazoline-HCl Composition:
| | | |
|---|---|---|
| Fluocinolone-acetonide-21-benzofuranate | 0.01 | gm |
| Polymyxine-B-sulfate | 0.07 | do. |
| Oxytetracycline·HCl | 0.6 | do. |
| 2-(5,6,7,8-tetrahydro-1-naphthylamino)-2-imidazoline HCl | 0.07 | do. |
| Aerosil | 0.05 | do. |
| Eye vaseline | 27.5 | do. |
| Wool fat | 2.5 | do. |
| Isopropyl myristate | 34.6 | do. |
| Paraffin oil, viscous | 20.7 | do. |
| Paraffin oil, fluid | 13.9 | do. |
| | 100.0 | gm |

Production:

Into the agglomerate-free suspension of the micronized active ingredients and Aerosil in a mixture of isopropyl myristate with paraffin oil was emulsified the warm melt (65°C) of the eye vaseline with wool fat with an immersion homogenizer. Subsequently the mixture was cooled to room temperature while stirring slowly.

PHARMACOLOGICAL DATA

A. Antiphlogistic Activity

The antiphlogistic activity was determined as antiexudative effects on egg albumin edema in the rat's hind paw. It was determined by the total activity obtainable after a single subcutaneous administration of equimolar doses.

In order to determine the antiphlogistic activity, the following compounds were tested and compared with the unesterified fluocinolone-acetonide.

A = Fluocinolone-acetonide-21-isonicotinate
B = Fluocinolone-acetonide-21-benzofuranate
C = Fluocinolone-acetonide-21-nicotinate
D = Fluocinolone-acetonide-21-l-menthoxy-acetate.

The edema was provoked and measured as described in Arzneimittelforschung, Vol. 13, page 588 (1963). For the tests, male FW-49 rats weighing about 120–140 gm at the beginning of the test were used. The substances were injected subcutaneously in one portion as a microcrystalline suspension in a solution consisting 10% of ethanol in a 0.9% sodium chloride solution at a volume of 0.5 ml/100 gm of animal. The control animals received corresponding quantities of the carrier liquid. The edema was induced 3, 7, 23, 47, 95 hours after the one-dose administration of the substance and, in case of longer lasting activity, at further 24 hours intervals. For the animals treated with the substance as well as to the control animals, the determination of the reduction of the swelling used the values obtained after 60 minutes after the provocation of the edema.

By provoking edema at various periods after the administration of the substance being tested, points on a curve were obtained whose integral expressed the overall activity of the said products at equimolar doses. The activity integrals calculated from the individual results and the relative activity resulting therefrom are reported in Table I.

TABLE I

| | Anti-exudative effect | | |
|---|---|---|---|
| Substance | Dosage in mgm/kg | activity integral | relative effect |
| Fluocinolone-acetonide | 0.25 | 937 | 1.0 |
| A | 0.308 | 2655 | 2.8 |
| B | 0.33 | 5139 | 5.5 |
| C | 0.308 | 3072 | 3.3 |
| D | 0.358 | 2048 | 2.2 |
| Fluocinoline-acetonide | 0.5 | 1904 | 1.0 |
| A | 0.615 | 5967 | 3.1 |
| B | 0.66 | 8393 | 4.4 |
| C | 0.616 | 4120 | 2.2 |
| D | 0.716 | 5238 | 2.8 |

Table I clearly shows that the esters of formula I are 2.2 to 5.5 times more active than fluocinolone acetonide when administered parenterally in single equimolar doses.

B. Glucocorticoid Activity

In order to determine the glucocorticoid activity, substances A and B were compared with regard to their total activity, obtained when administered in one portion of equimolar doses, with the activity of the unesterified fluocinolone-acetonide. The liver glycogen test was carried out as described in Arzneimittelforschung, Vol. 13, page 588 (1963). For the tests, male rats with an average weight of 80 gm at the beginning of the tests were used. On the first day of the tests, the substances were given as two single injections into the muscles of both hind legs. A 10% solution of ethanol in a 0.9% sodium chloride solution (volume per volume) was used as solvent vehicle. The control animals got the corresponding quantity of the solvent (1.0 ml per 100 gm). The difference between the average glycogen values of the animals treated with steroids and the control group, simply treated with the solvent, was measured in intervals of 24 hours after the single administration of substance in the rats, all fasting 24 hours before the withdrawal of liver. The average values for the glycogen increase served as approaching value for the activity integral on the single days following administration, until the end of the activity in comparison to the control animals.

TABLE II

| Substance | Dose mgm/kg | | Increase of liver glycogen compared to control animals by mgm of glycogen/gm of liver after | | | | | total activity glycogen increase in mgm/gm of liver | relative activity |
|---|---|---|---|---|---|---|---|---|---|
| | | | 24 hrs. | 48 hrs. | 72 hrs. | 96 hrs. | 120 hrs. | | |
| Fluocinolone-acetonide | 1.0 | x̄ | 23.6 | 0.3 | −1.8 | | | 23.9 | 1.0 |
| | | n | 12 | 12 | 12 | | | | |
| | | sx̄ | 0.9 | 1.4 | 0.1 | | | | |
| A | 1.23 | x̄ | 32.5 | 24.7 | −0.7 | | | 57.2 | 2.4 |
| | | n | 12 | 12 | 12 | | | | |
| | | sx̄ | 4.2 | 4.4 | 0.5 | | | | |
| B | 1.32 | x̄ | 31.9 | 37.4 | 18.6 | 1.7 | −2.6 | 89.6 | 3.8 |
| | | n | 12 | 12 | 12 | 11 | 11 | | |
| | | sx̄ | 4.0 | 4.8 | 1.9 | 1.2 | 1.2 | 0.5 | |

Table II shows that esters A and B are 2.5 and 3.8 times more active than fluocinolone-acetonide in its total gluconeogenetic action obtainable after a single intramuscular injection of equimolar doses. The increase of the total action of the ester, opposite to that of fluocinolone-acetonide, is achieved mainly by prolonged duration of activity, corresponding to the determination of the antiphologistic effect.

COMPARATIVE TEST DATA

The compounds used in the following tests were fluocinolone-acetonide or 6α, 9α-difluoro-16α, 17α-isopropylidenedioxy-$\Delta^{1,4}$-pregnadiene-11β, 21-diol-3,20-dione (A), the 21-acetate ester of fluocinolone-acetonide (B) and the 21-benzofuranate ester of fluocinolone-acetonide (C).

A. Glucocorticoid Activity

The test procedure is described in Arzneimittel-Forsch., Vol. 13, (1963), p. 588 and used male rats of our own strain weighing about 80 g each. The test compounds were administered intramuscularly in solution in a 10% solution of ethanol in 0.9% sodium chloride solution (Vol./Vol.). The control animals received a single dose of 1 ml per 100 g of the vehicle only while the other animals received 1 mg/kg of fluocinolone-acetonide or equimolar doses of the esters B (1.20mg/kg) and C (1.32 mg/kg). The animals were starved for 24 hours before the liver was excised. The amount of glycogen in the liver was determined 4,8,24 and 48 hours and in some cases where there was still an effect 72, 96 and 120 hours after a single administration of the substance. The results are reported in Table I.

The results of Table I show that on an equimolar basis, compound C of the above application has a glucocorticoid activity 3.3 times greater than the free alcohol A while the acetate ester B is only 1.6 times more active than the free alcohol A. Moreover, this is shown mainly by its markedly prolonged duration of activity.

B. Antiphlogistic Activity

The test procedure used is described in Arzneimittel-Forsch., Vol. 13 (1963), p. 588 and used male rats of our own strain weighing between 120–150 g at the start of the test. The test animals received a single subcutaneous injection of equimolar doses of the test compounds and edema was provoked in rear paw of the rats with ovalbumin. The anti-exudative effect was then determined by comparison of the swellings of the paws at periods of 4,8,24,48,72,96, 120, 144 and 168 hours after the administration of the test products. The results are reported in Table II.

TABLE II

|  |  | 4 | 8 | 24 | 48 | Hours After Application 72 | 96 | 120 | 144 | 168 |
|---|---|---|---|---|---|---|---|---|---|---|
| 0,5 mg/kg of A |  | 179.0 | 139.5 | 185.0 | 215.5 | 307.0 |  |  |  |  |
| Controls |  | 283.5 | 253.5 | 294.1 | 277.0 | 311.0 |  |  |  |  |
| reduction of swelling | % | 36.9 | 45.0 | 37.1 | 22.2 | 1.3 |  |  |  |  |
| 0,66 mg/kg of C |  | 205.5 | 158.1 | 117.5 | 57.0 | 96.3 | 73.5 | 195.5 | 226.0 | 273.5 |
| Controls |  | 283.5 | 253.5 | 294.0 | 277.1 | 311.1 | 291.0 | 291.1 | 287.0 | 280.0 |
| reduction of swelling | % | 27.5 | 37.7 | 60.0 | 79.4 | 69.1 | 74.7 | 32.8 | 21.3 | 2.3 |
| 0.60 mg/kg of B |  | 135.0 | 106.5 | 111.0 | 142.0 | 197.0 | 236.0 | 293.0 |  |  |
| Controls |  | 244.5 | 238.5 | 303.5 | 303.5 | 303.5 | 243.5 | 276.5 |  |  |
| reduction of swelling | % | 44.8 | 55.3 | 63.4 | 53.2 | 35.1 | 3.1 | 0 |  |  |

The results of Table II show that the antiphlogistic activity of compound C of the invention is 4.4 times greater than the free alcohol A while compound B is only 2.2 times more effective than compound A.

C. Hypophysial-inhibiting Activity

The hypophysial-inhibiting activity was determined on male rats of our own strain having an average weight of 110 g at the start of the test using the procedure described in Arzneimittel-Forsch., Vol. 13, (1963), p. 588. The animals received a single daily subcutaneous dose of the test products once a day for 14 days. The products were administered as a suspension in sesame oil in a volume of 0.2 ml per 100 g. On the 15th day, the animals were killed and the adrenal glands were removed and weighed. The mean absolute weights of the glands were compared with the controls to determine

TABLE I

| Product |  | Content of glycogen in the liver in mg/g liver after | | | | | | |
|---|---|---|---|---|---|---|---|---|
|  |  | 4h | 8h | 24h | 48h | 72h | 96h | 120h |
| A |  | 11.15 | 20.37 | 26.63 | 3.00 | 0.57 |  |  |
| Controls |  | 1.93 | 2.00 | 3.08 | 2.69 | 2.33 |  |  |
| Increase of liver-glycogen | mg/g | 9.22 | 18.37 | 23.55 | 0.31 | −1.76 |  |  |
| C |  | 12.11 | 31.62 | 34.85 | 39.71 | 21.79 | 4.53 | 1.93 |
| Controls |  | 1.79 | 5.28 | 2.92 | 2.28 | 3.17 | 2.87 | 4.54 |
| Increase of liver-glycogen | mg/g | 10.32 | 26.34 | 31.93 | 37.43 | 18.62 | 1.66 | −2.61 |
| B |  | 10.97 | 18.45 | 43.46 | 7.05 | 0.91 |  |  |
| Controls |  | 4.44 | 1.10 | 3.05 | 3.17 | 3.03 |  |  |
| Increase of liver-glycogen | mg/g | 6.53 | 17.35 | 40.41 | 3.88 | −2.12 |  |  | the percent reduction. The $ED_{50}$ for each product was determined by graphic extrapolation and the results are reported in Table III.

TABLE III

| Product | Daily dose gamma/kg | Wt. of adrenal glands in mg | Change compared to controls in % | ED/50 gamma/kg |
|---|---|---|---|---|
| Controls | — | 40.5 | — | — |
| A | 2.5 | 38.8 | −4.2 | |
| | 5.0 | 32.2 | −20.5 | |
| | 10.0 | 29.8 | −26.4 | 20.0 |
| | 20.0 | 18.8 | −53.6 | |
| | 40.0 | 14.7 | −63.7 | |
| Controls | — | 40.5 | — | — |
| C | 2.5 | 37.5 | −7.4 | |
| | 5.0 | 36.7 | −9.4 | |
| | 10.0 | 32.9 | −18.8 | ab.48.0* |
| | 20.0 | 27.4 | −32.3 | |
| | 40.0 | 21.4 | −47.2 | |
| Controls | — | 44.2 | — | — |
| B | 2.5 | 41.2 | −6.7 | |
| | 5.0 | 36.3 | −17.9 | |
| | 10.0 | 28.6 | −35.3 | 16.5** |
| | 20.0 | 18.0 | −59.3 | |
| | 40.0 | 14.0 | −68.3 | |

*Corresponds on a molar basis to 36.4 gamma/kg free fluocinolonacetonide
**Corresponds on a molar basis to 13.8 gamma/kg free fluocinolonacetonide The results of Table III show that on a molar basis, compound C of the above application has only half of the hypophysial inhibiting activity of free alcohol A while compound B has a greater hypophysial inhibiting activity than compound A.

CONCLUSION

The results of the above tests show that compound C of the above-identification has a glucocorticoid activity 3.3 times greater than the free alcohol and an antiphlogistic activity 4.4 times greater than the alcohol on a molar basis while having only one half of the undesired hypophysial inhibiting activity of the free alcohol. This means that the therapeutic index of compound C is 6 to 8 times greater than that of the free alcohol.

In contrast, the prior art ester B has a glucocorticoid activity 1.6 times greater than the free alcohol and an antiphlogistic activity 2.2 times greater than the free alcohol on a molar basis while the undesired hypophysial inhibiting activity is about 1.5 times greater than the free alcohol. This means that the therapeutic index for compound B is about equivalent to that of compound A. Therefore, compound C has a clear high degree of anti-inflammatory activity without hypophysial inhibiting activity which is not true for compounds A and B.

Various modifications of the compositions and method of the invention may be made without departing from the spirit or scope thereof and it is to be understood that the invention is to be limited only as defined in the appended claims.

We claim:

1. An anti-inflammatory composition comprising an effective amount of an ester of fluocinolone-acetonide of the formula

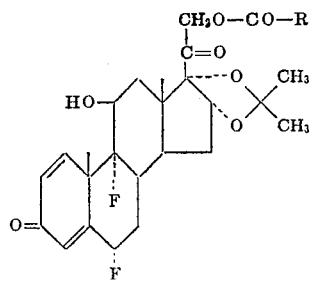

wherein R is selected from the group consisting of pyridine-3, pyridine-4, benzofuran-2 or 1-menthoxymethyl and a pharmaceutical carrier.

2. The composition of claim 1 which is fluocinolone-acetonide-21-nicotinate.

3. The composition of claim 1 which is fluocinolone-acetonide-21-isonicotinate.

4. The composition of claim 1 which is fluocinolone-acetonide-21-benzofuranate.

5. The composition of claim 1 which is fluocinolone-acetonide-21-l-menthoxy-acetate.

6. A method of treating inflammation in warm-blooded animals comprising administering to warm-blooded animals an effective anti-inflammatory amount of a compound of the formula

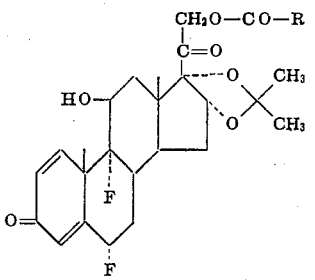

wherein R is selected from the group consisting of pyridine-3, pyridine-4, benzofuran-2 or 1-menthoxymethyl.

7. The method of claim 6 wherein the compound is fluocinolone-acetonide-21-nicotinate.

8. The method of claim 6 wherein the compound is fluocinolone-acetonide-21-isonicotinate.

9. The method of claim 6 wherein the compound is fluocinolone-acetonide-21-benzofuranate.

10. The method of claim 6 wherein the compound is fluocinolone-acetonide-21-l-menthoxyacetate.

* * * * *

PO-1050
(5/69)

UNITED STATES PATENT OFFICE
CERTIFICATE OF CORRECTION

Patent No. 3,829,570            Dated August 13, 1974

Inventor(s) JOACHIM HEIDER, WOLFGANG EBERLEIN and GUNTHER ENGELHARDT

It is certified that error appears in the above-identified patent and that said Letters Patent are hereby corrected as shown below:

[75] Correct the name of --WOLFGANG EBERLEIN--.

Insert
[30] Foreign Application Priority Data
     Feb. 4, 1970...Germany............ 2005002

In line 5 of [57] ABSTRACT
    delete "c,20-dione 21 diol".

Col. 8, last line of TABLE II under "120 hrs."
    delete "1.2" and insert --0.5--;

under "total activity...."
    delete "0.5".

Signed and sealed this 18th day of March 1975.

SEAL)
test:

JTH C. MASON
testing Officer

C. MARSHALL DANN
Commissioner of Patents
and Trademarks